United States Patent [19]

Harris et al.

[11] Patent Number: 5,658,970

[45] Date of Patent: Aug. 19, 1997

[54] METHOD FOR CATHODIC ELECTROCOAT COMPOSITIONS CONTAINING SELF-CROSSLINKING POLYMERS

[75] Inventors: Paul J. Harris, West Bloomfield; Timothy S. December, Rochester, both of Mich.

[73] Assignee: BASF Corporation, Southfield, Mich.

[21] Appl. No.: 559,220

[22] Filed: Nov. 16, 1995

[51] Int. Cl.$^6$ ................................ C08K 3/20; C08L 63/02
[52] U.S. Cl. ........................ 523/414; 204/499; 204/514; 525/523; 528/123
[58] Field of Search ........................ 204/499, 514; 523/414; 525/523; 528/123

[56] References Cited

U.S. PATENT DOCUMENTS

| | | | |
|---|---|---|---|
| 3,947,339 | 3/1976 | Jerabek et al. | 204/181 |
| 4,435,559 | 3/1984 | Valko . | |
| 4,484,994 | 11/1984 | Jacobs, III et al. . | |
| 4,528,363 | 7/1985 | Tominaga . | |
| 4,542,173 | 9/1985 | Schupp et al. . | |
| 4,897,435 | 1/1990 | Jacobs, III et al. . | |
| 5,057,559 | 10/1991 | Paar et al. . | |

FOREIGN PATENT DOCUMENTS 2001700  5/1990  Canada .

OTHER PUBLICATIONS

Hawley's Condensed Chemical Dictionary, 1993, p. 35.

Primary Examiner—Melvyn I. Marquis
Assistant Examiner—D. Aylward
Attorney, Agent, or Firm—Anne Gerry Sabourin

[57] ABSTRACT

Cathodic electrocoat compositions containing self-crosslinking polymers are described. The polymers of the invention are formed from an epoxide-functional prepolymer having polyepoxide and extender segments. Each extender segment has at least one pendant hydroxyalkyl carbamate group. The prepolymer is reacted with an amine compound having at least one blocked primary amine group and at least one epoxide-reactive group. The primary amine group is unblocked and the resultant polymer is dispersed in water with the aid of a neutralizing acid.

22 Claims, No Drawings

METHOD FOR CATHODIC ELECTROCOAT COMPOSITIONS CONTAINING SELF-CROSSLINKING POLYMERS

BACKGROUND OF THE INVENTION

The present invention relates to electrocoat coating compositions containing self-crosslinking polymers. The self-crosslinking polymers of the invention are epoxy resins having terminal primary amine groups and a multiplicity of carbamate groups located along the backbone.

Electrocoating, or electrodeposition coating, is widely used in the art for the application of polymeric coatings to electrically conductive substrates. In the electrocoat process, the substrate to be coated is used as one electrode in an electrical cell so that a current passed through the aqueous bath will deposit the coating onto the substrate. One of the advantages of electrocoat compositions and processes is that the applied coating composition forms a uniform and contiguous layer on all exposed surfaces regardless of shape or configuration of the article. This is especially advantageous when the coating is applied as an anticorrosive coating onto a substrate having an irregular surface, such as a motor vehicle body. The even, continuous coating layer over all areas of the metallic substrate provides maximum anticorrosion effectiveness.

Electrocoat compositions usually comprise an aqueous dispersion of a principal film-forming resin, such as an acrylic or epoxy resin, having ionic stabilization. The electrocoat composition is preferably a cathodic electrocoat, composition when corrosion resistance of the coated substrate is a concern. A cathodic electrocoat composition is produced by using a principal resin having amine functionality. The amine functionality is at least partially neutralized to produce the corresponding amine salt. A sufficient number of neutralizable amine groups are required to make a stable dispersion or emulsion.

For automotive or industrial applications where hard, durable electrocoat films are desired, the electrocoat compositions are formulated to be curable compositions. Usually, this is accomplished by including in the bath a crosslinking agent that can react with functional groups on the principal resin under the appropriate conditions and thus cure the coating. The crosslinking agent and the polymer that is used as the principle resin react to form an intractable, insoluble polymeric network. For example, the electrocoat compositions may comprise a blocked isocyanate crosslinker that unblocks and reacts with the principal resin upon application of sufficient heat. Isocyanate crosslinkers have been preferred by the industry because of the toughness and durability that they impart to the cured film. However, the isocyanate crosslinkers are usually prepared from toxic isocyanate monomers and thus present exposure hazards during manufacture. In particular, aromatic isocyanate monomers, such as toluene diisocyanate, are hazardous. It would therefore be desirable to have a curable electrocoat composition that does not have the toxicity problems associated with isocyanate crosslinkers, yet produces films with the same excellent physical properties. Additionally, the principal resin and the blocked isocyanate crosslinkers must be prepared in separate processes. The manufacture of the electrocoat compositions must include a blending step where the crosslinker and principal resin are blended before being dispersed. A self-crosslinking principal resin would also simplify the manufacturing process by eliminating the separate crosslinker synthesis and blending steps.

We have now discovered an improved method of producing electrocoat coating compositions and self-crosslinking polymers for electrocoat coating compositions. The self-crosslinking polymers of our invention are linear or slightly branched polymers having terminal primary amine groups. The incorporation of primary amine groups onto the ends of the polymer according to the invention results in improved bath properties and provides improved coating compositions. Furthermore, the instant process introduces the crosslinking groups in a controlled and reproducible way, allowing for greater control of the architecture of the resulting crosslinked film. The instant process also does not require a separate preparation of a crosslinking resin or a blending step to combine the crosslinker with the principal resin.

SUMMARY OF THE INVENTION

The present invention provides a method for making an aqueous dispersion of a self-crosslinkable cationic polymer. "Dispersion" and "emulsion" are used interchangeably herein to denote the stable state of the neutralized polymer or resin solution of the neutralized polymer in water. The method comprises forming an epoxide-functional prepolymer from a polyepoxide and an extender, then reacting the epoxide groups with an amine compound having at least one epoxide-reactive group and at least one blocked primary amine group. Finally an aqueous dispersion of the polymer is formed by unblocking and at least partially neutralizing the amine groups before or during addition of the water. The prepolymer is characterized in that each extender segment has at least one pendant hydroxyalkyl carbamate group. When the coating containing the polymer is cured, these hydroxyalkyl carbamate groups react with backbone hydroxyl groups or with the primary amine groups to self-crosslink the polymer.

Another aspect of the invention provides for two methods of forming the epoxide-functional prepolymer. According to one method, the prepolymer is formed by means of reacting together an extender, having at least one blocked primary amine group and at least two epoxide-reactive groups, with an excess of a polyepoxide Then the primary amine groups are unblocked and reacted with an alkylene carbonate, under appropriate conditions, to form hydroxyalkyl carbamate groups. The alkylene carbonate is preferably ethylene carbonate or propylene carbonate and the epoxide-reactive groups are preferably secondary amine or hydroxyl groups.

Alternatively, the invention provides for forming the epoxide-functional prepolymer by first reacting an extender having at least one primary amine group and at least two epoxide-reactive groups with an alkylene carbonate to convert the primary amine groups into hydroxyalkyl carbamate groups, and then reacting the epoxide-reactive groups with an excess of a polyepoxide. Again, the alkylene carbonate is preferably ethylene carbonate or propylene carbonate and the epoxide-reactive groups are preferably secondary amine or hydroxyl groups.

The invention also encompasses a coating composition comprising the aqueous dispersion of a self-crosslinkable cationic polymer prepared according to the described methods. In a particularly desirable embodiment, the coating composition is an electrocoat coating composition. The coating composition is electrodeposited onto a metallic article and cured by means of self-crosslinking the polymer to form a coated article. The coating so formed is hard and durable.

DETAILED DESCRIPTION OF THE INVENTION

The self-crosslinkable cationic polymer of the invention is formed by reacting epoxide groups of a prepolymer with an amine compound. The prepolymer has polyepoxide and extender segments, each extender segment having at least one pendant hydroxyalkyl carbamate group. The amine compound is one having at least one epoxide-reactive group and at least one blocked primary amine group. The prepolymer and the amine compound, along with, if desired, other compounds having epoxide-reactive groups, are reacted together to form a polymer. The epoxide groups of the prepolymer are completely consumed in the reaction with the amine compound and, optionally, the other compounds with epoxide-reactive groups. An aqueous cationic dispersion of the polymer is then formed by unblocking the primary amine groups and at least partially neutralizing the amine groups of the polymer before or during addition of a sufficient amount of water to form a dispersion of the polymer. The dispersed polymer can be used in an electrocoat coating composition for electrodeposition onto metallic substrates and articles. For example, in one preferred embodiment the electrocoat coating composition containing the self-crosslinkable cationic polymer is used as an electrocoat primer for automotive applications, such as for coating on vehicle bodies or wheel rims. The electrodeposited coating layer is cured to form an intractable, insoluble coating layer. One preferred method of cure is by baking at an elevated temperature. The coating is cured through reaction of the hydroxyalkyl carbamate groups with the primary amine groups and/or with the backbone hydroxyl groups that result when the oxirane groups of the polyepoxide are reacted with the extender.

The epoxide-functional prepolymer is the reaction product of an excess of a polyepoxide with an extender. Suitable polyepoxides are glycidyl ethers and esters of diols, triols, bisphenols, and higher polyols, and cyclohexene oxides. The polyepoxide is preferably a diepoxide or a mixture of diepoxide and triepoxide. The diepoxides may be monomeric or oligomeric. In a particularly preferred embodiment, the diepoxide is a diglycidyl ether of a diol, especially the diglycidyl ethers of bisphenol A or other diphenols. For example, the diepoxide can be the diglycidyl ether of phenolic compounds such as 2,2-bis(4-hydroxyphenyl) propane, 2,2-bis(4-hydroxy-3-methylphenyl)propane, 4,4'-dihydroxybenzophenone, dihydroxyacetophenones, 1,1-bis (4-hydroxyphenyl)ethane, bis(4-hydroxyphenyl) methane, 1,1-bis(4-hydroxyphenyl)isobutane, 2,2-bis(4-hydroxy-tert-butylphenyl) propane, dihydroxynaphthylenes, resorcinol, and the like. Also suitable are the diglycidyl ethers of aliphatic diols, including the diglycidyl ethers of 1,4-butanediol, cyclohexanedimethanols, ethylene glycol, propylene glycol, dipropylene glycol, polypropylene glycol, diethylene glycol, triethylene glycol, polyethylene glycol, 1,3-propanediol, 2,2,4-trimethyl-1,3-pentanediol, 1,6-hexanediol, 2,2-bis(4-hydroxycyclohexyl) propane, 1,4-bis (2-hydroxyethyl)piperazine, and the like. Triglycidyl ethers such as the triglycidyl ethers of trimethylolpropane, trimethylolethane, 2,6-bis(hydroxymethyl)-p-cresol, and glycerol can also be used, especially in mixtures with the preferred diglycidyl ethers.

Diglycidyl esters of dicarboxylic acids are also useful in preparing the invention polymers. Specific examples of compounds include the diglycidyl esters of oxalic acid, cyclohexanediacetic acids, cylcohexanedicarboxylic acids, succinic acid, glutaric acid, phthalic acid, terephthalic acid, isophthalic acid, naphthalene dicarboxylic acids, and the like. Diglycidyl ethers and esters are available commercially, for example under the tradename EPON® from Shell Chemical Company, Houston, Tex.; under the tradename D.E.R. from Dow Chemical Company, Midland, Mich.; and under the tradename ARALDITE® from Ciba Geigy, Ardsley, N.Y.

In another preferred embodiment, the epoxide-functional prepolymer is prepared using a polyepoxide that is modified by reaction with a modifying compound to produce a polyepoxide of higher molecular weight. A polyepoxide of higher weight per epoxide may be formed, for example, by reacting a polyglycidyl ether or ester, such as those described above, with a polyphenol or another aliphatic or aromatic compound having epoxide-reactive groups. Preferably, the polyepoxide used is a diepoxide and preferably a diepoxide of higher molecular weight is produced. The modifying compound can be chosen to enhance the properties of the polyepoxide, for example by making the polyepoxide more flexible. Preferable modifying compounds include polyphenols, polyamines, and alkoxypolyamines, such as those sold by Huntsman, Houston, Tex., under the tradename JEFFAMINE®. Such a modified prepolymer is preferably prepared from a diepoxide and a diphenol or other di-functional modifying compound of the types named herein. Bisphenol A is one preferred modifying compound.

The weight per epoxide of the polyepoxide used to form the prepolymer is from 150 to 2000, preferably from 500 to 1200, and more preferably from 500 to 800.

The extender used to prepare the epoxide-functional prepolymer of the invention has at least two groups reactive with epoxide groups and at least one primary amine group. The groups reactive with the epoxide group may be amine, acid, or alcohol, such as phenol, groups. Amine groups are preferred as the epoxide-reactive groups. The primary amine group is derivatized, either before or after the extender is reacted to make the epoxide-functional prepolymer, by reaction with an alkylene carbonate to form hydroxyalkyl carbamate groups. The extender has at least one primary amine group, but may have two or more primary amine groups. Preferably, the extender has one or two primary amine groups, and it is particularly preferable for the extender to have two primary amine groups. Examples of suitable extenders include polyalkylenepolyamines such as triethylenetetramine, tetraethylenepentamine, pentaethylenehexamine, tripropylenetetramine, tetrapropylenepentamine, and pentapropylenehexamine, as well as polyalkylenepolyamine of the general structure

$H_2NR_3NHR_4NHR_3NH_2$, where $R_3$ and $R_4$ are each independently alkyl of up to 10 carbon atoms, preferably alkyl of up to 4 carbon atoms, and more preferably $R_3$ is ethyl and $R_4$ is alkyl of up to 4 carbon atoms, for example where the polyalkylenepolyamine is N,N'-Bis(3-aminopropyl)ethylenediamine; hydroxy-functional amine compounds having the general structure

$H_2NR_5NHR_6OH$, where $R_5$ and $R_6$ are each independently alkyl of up to 8 carbon atoms, and preferably of up to 4 carbon atoms, such as N-(2-hydroxyethyl)propane-1,3-diamine; and the like. Trialkylenetetramines where the alkylene group has up to 3 carbon atoms are preferred. Triethylenetetramine is particularly preferred.

According to one method of practicing the invention, the primary amine groups of the extender are derivatized to the hydroxyalkyl carbamate groups before the extender is reacted with the polyepoxide. Reaction of the primary amine groups of the extender with the cyclic carbonate is carried out neat or with solvent. If solvent is used, it is preferably inert toward both the carbonate and the amine groups. Suitable solvents include water, alcohols, ethers, esters, ketones, and aromatic and aliphatic hydrocarbons. For example, alkylene ethers of ethylene or propylene glycol, xylene, toluene methyl isobutyl ketone, diacetone alcohol, or butyl acetate may be used as solvents. The reaction may be carried out at temperatures of from 0° C. to 120° C., and preferably the reaction temperature is from 15° C. to 100° C. The endpoint can be detected by titration of the amine or by monitoring consumption of the carbamate group via infrared spectroscopy.

The alkylene carbonates used in the method of the invention are five-member heterocyclic carbonates. The alkylene carbonates can be prepared by reacting a compound having an oxirane group with carbon dioxide. For example, propylene carbonate may be prepared by reacting propylene oxide with carbon dioxide. Suitable alkylene carbonates include ethylene carbonate, propylene carbonate, glycerin carbonate, styrene carbonate, isobutylene carbonate, and butylene carbonate. Ethylene carbonate and propylene carbonate are preferred and are readily available commercially. Reaction of the primary amines with ethylene carbonate and with propylene carbonate generate pendant hydroxyethyl carbamate groups and hydroxypropyl carbamate groups, respectively.

When the polyepoxide and the extender having at least two epoxide-reactive groups are reacted, the polyepoxide is present in excess so that the reaction product is epoxide-functional. The ratio of equivalents of epoxide to epoxide-reactive group is preferably from 1.1:1 to 2:1, and more preferably it is from 1.3:1 to 1.6:1. The reaction is continued until the weight per epoxide indicates that all of the epoxide-reactive groups have been consumed. Typically, the reaction is complete in one to four hours. When the epoxide-reactive groups are amine groups, the reaction is carried out at temperatures between 60° and 90° C. However, when one of the epoxide-reactive groups is hydroxyl, the reaction is usually carried out at a higher temperature, for example at 130° C. A catalyst such as a tertiary amine like dimethylbenzylamine, may be useful. The weight per epoxide of the epoxy-functional prepolymer is from 1000 to 3000, and preferably it is from 1200 to 2200.

When the primary amine groups of the preferred trialkylenetetramine are derivatized in this way, the extender segment of the epoxide-functional prepolymer and of the cationic polymer made therefrom will be of the formula:

$R_1$ and $R_{b\,2}$ are preferably each independently alkyl of up to 3 carbon atoms. It is particularly useful to have $R_1$ be ethyl and $R_2$ be alkyl of up to 3 carbon atoms. In a preferred embodiment, triethylenetetramine is first reacted with ethylene carbonate or propylene carbonate to form a polyamine product having at least one hydroxyalkyl carbamate group and preferably two hydroxyalkyl carbamate groups. In this case, $R_1$ is ethyl and $R_2$ is ethyl or isopropyl in the above formula. The polyamine product is then reacted with an excess of bisphenol A to form the epoxide-functional prepolymer of the invention.

According to a second method of practicing the invention, the primary amine groups of the extender are derivatized to the hydroxyalkyl carbamate group after the extender is reacted with the polyepoxide. In this case, the primary amines are protected during the reaction with the polyepoxide by blocking with ketimine groups or by other means. Ketimines are preferred because the conversion of the primary amine to ketimine is facile, uses readily-available ketones, and the primary amines are easily regenerated by adding water. The primary amine groups are reacted with a ketone to make the ketimine group. Useful ketones include acetone, methyl ethyl ketone, methyl n-butyl ketone, methyl isobutyl ketone, diethyl ketone, methyl propyl ketone, methyl isopropyl ketone, methyl isobutyl ketone, and acetophenone. One preferred ketone is methyl isobutyl ketone. In general, the reaction may be carried out at the reflux temperature of the ketone used and is driven by the removal of the by-product, water. The extender, having primary amine groups blocked, either by the ketimines or otherwise, is then reacted with an excess of the polyepoxide in the same manner as used for the first method. After the reaction is completed, the primary amines are regenerated from the ketimine by addition of water.

The regenerated primary amine groups are then reacted with an alkylene carbonate in the same manner as described for the first method. The result is again an epoxide-functional prepolymer having hydroxyalkyl carbamate groups pendant to each extender segment. In a preferred embodiment of the invention according to this method, the primary amine groups of triethylenetetramine are first blocked, preferably by reaction with methyl ethyl ketone to form the corresponding ketimine. The triethylenetetramine, with at least one and preferably both primary amine groups blocked, is used as the extender in a further reaction through its unblocked secondary amine groups. Preferably, the triethylenetetramine is reacted with an excess of bisphenol A. After the epoxy-secondary amine reaction is completed, a sufficient amount of water is added in order to regenerate the primary amine groups. Finally, at least one, and preferably both, of the primary amine groups of each extender segment are reacted with ethylene carbonate or propylene carbonate to form the epoxide-functional prepolymer of the invention having pendant hydroxyalkyl carbamate groups. In a preferred embodiment, the epoxide-functional prepolymer prepared according to either method described herein has two pendant hydroxyalkyl carbamate groups for each extender segment.

Finally, the epoxide-functional prepolymer as prepared by either method is reacted with a capping amine compound. The capping amine compound has at least one secondary amine and at least one blocked primary amine group. Preferably, the capping amine compound has one secondary amine and at least one blocked primary amine group. The epoxide groups of the prepolymer are completely consumed by reaction with the amine compound and, optionally, other compounds with epoxide-reactive groups. For example, the prepolymer may be reacted with the diketimine of diethylenetriamine, the ketimine of N-isopropylethylenediamine, the ketimine of N-propylethylenediamine, the ketimine of N-propyl-1,3-propanediamine, the ketimine of 2-amino-3-methyl-1-butanol, and similar compounds. The other compounds with epoxide-reactive groups that may optionally be reacted with some of the epoxide groups of the prepolymer include methylethanolamine, diethanolamine, and similar secondary amine-containing compounds. Preferably, the capping amine compound is the diketimine of diethylenetriamine. In another preferred embodiment, the prepolymer is reacted with a mixture of the diketimine of diethylenetriamine and one or both of methyl ethanolamine and diethanolamine. It is preferable to have at least half of the epoxide-reactive groups supplied by the capping amine compound having at least one secondary amine and at least one blocked primary amine group.

The method used to block the primary amine groups may be the same as previously described for blocking the primary amines of the extender. Blocking by forming a ketimine is preferred. Ketimines are also commercially available, for example from Air Products and Chemicals, Inc., Allentown, Pa. After the reaction of the capping amine compound with the prepolymer is completed, the primary amine groups are regenerated by addition of water, forming the polymer of the invention.

The polymer so formed is dispersed or emulsified in an aqueous medium with an acid. The acid neutralizes the amine groups of the polymer in an amount sufficient to impart water-dispersibility to the polymer. The aqueous polymer dispersion thereby produced is the self-crosslinkable cationic polymer dispersion of the invention. Examples of acids that may be used to at least partially neutralize the amine groups include phosphoric acid, acetic acid, propionic acid, and lactic acid. The resin may be fully neutralized; however, partial neutralization is usually sufficient to achieve a stable dispersion or emulsion. By "at least partial neutralization" we mean that at least one of the amine groups on the resin is neutralized, and up to all of such groups may be neutralized. The degree of neutralization necessary to afford the requisite water-dispersibility for a particular resin will depend upon its molecular weight and particular composition and can readily be determined by one of ordinary skill in the art through straightforward experimentation.

The electrocoat coating composition may also include water-miscible or water-soluble cosolvents. Some organic cosolvent is usually added to electrocoat coating compositions because the cosolvents aid in dispersing the polymers and also may help to coalesce the film and/or improve flow during cure to help form a smooth coating. Useful cosolvents include alcohols, esters, ethers, and ketones. Specific desirable cosolvents include monoalkyl and dialkyl ethers of ethylene or propylene glycol and their esters, diacetone alcohol, and butyl glycol. Particularly preferred among these are ethylene glycol monophenyl ether, propylene glycol monophenyl ether, ethylene glycol monobutyl ether, and ethylene glycol monohexyl ether. The amount of cosolvent is generally between about 0 and 15 percent, and preferably between about 0.5 and 5 percent, by weight, based on total weight of the resin solids. A small amount of a water-immiscible organic solvent, such as xylene, toluene, methyl isobutyl ketone, or 2-ethylhexanol, may also be present. Typically, such water-immiscible solvents, if present, are present from the prior synthesis of the resin.

Pigments may be present in the composition in amounts between 0 and 35% by weight, based on total weight of solids in the coating composition. Preferably, between 15 and 25% pigment is used, based on total weight of solids in the coating composition. The pigments used may be inorganic pigments, including metal oxides, chromates, molybdates, phosphates, and silicates. Examples of inorganic pigments that could be employed are titanium dioxide, barium sulfate, carbon black, ocher, sienna, umber, hematite, limonite, red iron oxide, transparent red iron oxide, black iron oxide, brown iron oxide, chromium oxide green, strontium chromate, zinc phosphate, silicas such as fumed silica, talc, barytes, ferric ferrocyanide (Prussian blue), ultramarine, lead chromate, lead molybdate, and lead silicate. Organic pigments may also be used. Examples of useful organic pigments are metallized and non-metallized azo reds, quinacridone reds and violets, perylene reds, copper phthalocyanine blues and greens, carbazole violet, monoarylide and diarylide yellows, benzimidazolone yellows, tolyl orange, naphthol orange, and the like. The preferred pigments depend upon the desired color of the coating. When the coating applied is a primer, carbon black, titanium dioxide, extender pigments such as clay, and anti-corrosion pigments are commonly included.

It is normally necessary that the pigments be ground in the presence of a grinding resin or a dispersant compound. The grinding may be done using methods and equipment known to the art. A basic discussion is provided in *Federation Series on Coatings Technology, Unit Sixteen: Dispersion and Grinding* (Pub. by Federation of Societies for Paint Technology, Philadelphia, Pa., 1970), incorporated herein by reference.

Preferably, a premix is first prepared by stirring together the pigment to be ground, the dispersant compound or grinding resin, and solvent. Preferably, the solvent is water or a water compatible solvent, or a mixture thereof. Useful dispersant compounds are described in U.S. Pat. No. 5,231, 134, and in U.S. application Ser. No. 08/360,502, the disclosures of which are herein incorporated by reference. Useful pigment grinding resins are described in U.S. Pat. Nos. 4,769,400; 5,281,316; and 5,324,404, the disclosures of which are herein incorporated by reference. It is particularly preferred that the grinding resin or dispersant compound be reactive with the self-crosslinking polymer of the invention or, if not reactive therewith, be present at levels of less than five percent by weight, based on total weight of the resin solids.

The electrocoat coating compositions of the present invention are aqueous. The resin emulsion or dispersion is usually from 15 to 45 percent nonvolatiles, preferably from 30 to 40 percent nonvolatiles. The nonvolatiles portion of the resin dispersion includes the self-crosslinking polymer of the invention along with any others resins or polymers or any crosslinkers that may have been co-dispersed with the polymer of the invention. The resin dispersion and the pigment dispersion are mixed together and often further diluted with deionized water to form the electrocoat coating composition. The electrocoat coating composition is usually 15 to 40 percent nonvolatile, preferably 15 to 25 percent nonvolatile. The average particle size diameter of the resinous phase is about 0.1 to 10 microns, preferably less than 5 microns.

The ratio of pigment to resin can vary widely, depending upon the pigments used and the desired properties of the finished film. For example, a black film may be deposited using 0.5 parts of carbon black to 99.5 parts of resin, while a white film may be plated using 50 parts of titanium dioxide to 50 parts of resin. Usually, the pigment is 10 to 40 percent of the nonvolatile material in the electrocoat coating composition. Preferably, the pigment is 15 to 30 percent of the nonvolatile material in the electrocoat coating composition.

The electrodeposition coating compositions used in the invention can contain optional ingredients such as dyes, flow control agents, catalysts, wetting agents, surfactants, UV absorbers hindered amine light stabilizer compounds, antioxidants, defoamers, and so on. Examples of surfactants and wetting agents include alkyl imidazolines such as those available from Ciba-Geigy Industrial Chemicals as Amine C®, acetylenic alcohols such as those available from Air Products and Chemicals as Surfynol®. Surfactants and wetting agents, when present, typically are up to two percent by weight, based on total resin solids. Plasticizers are optionally included to promote flow. Examples are high boiling water immiscible materials such as ethylene or propylene oxide adducts of nonyl phenols or bisphenol A. Plasticizers can be used at levels of up to fifteen percent by weight, based on total resin solids.

Catalysts to promote the curing reaction, such as metal salts or complexes, can be used in the coating composition.

Typically, the cure catalyst is a salt or complex of a metal such as lead, zinc, iron, tin, and manganese. Suitable salts of these metals include octoate, naphthanates, acetates, and dilaurates. Particular examples are dibutyltin dilaurate, tin acetate, stannous octoate, and dibutyltin oxide. When used, catalysts are typically present in amounts of about 0.05 to 2 percent by weight metal based on weight of total resin solids.

The electrocoat coating composition should have an electroconductivity from 800 micromhos to 3000 micromhos. When conductivity is too low, it is difficult to obtain a film of desired thickness and properties. On the other hand, if the composition is too conductive, problems such as the dissolution of the deposited film, uneven film thickness, rupturing of the film, or poor resistance of the film to corrosion or water spotting may result.

The coating composition according to the present invention is electrocoated, or electrodeposited, onto a substrate and then cured to form a coated article. The electrocoat coating composition may be applied onto any conductive substrate, such as steel, copper, aluminum, or other metals or metal alloys, to a dry film thickness typically of 10 to 40 microns. In a particularly preferred embodiment, the article coated with the composition of the invention is a metallic automotive part or body.

The electrocoating of the coating preparations according to the invention may be carried out by any of a number of processes known to those skilled in the art. The article is immersed into the coating composition of the invention and is the cathode in the electrodeposition of the coating. The deposition voltages are typically from 50 to 500 volts, preferably from 150 to 350 volts. After deposition of the coating layer onto the article, the coated article is removed from the bath and rinsed with deionized water. The deposited coating layer is then cured to a hard, durable coating by means of self-crosslinking the cationic polymer of the invention. The crosslinking is usually effected by subjecting the coating to elevated temperatures. Preferably, the coated article is subjected to temperatures of from 300 to 400° F. for from 15 minutes to 60 minutes.

Other coatings may be applied over the cured electrocoat coating. When the electrocoat layer is used as a primer in automotive applications, one or more additional coating layers, such as a primer-surfacer, color coat, and, optionally, a clearcoat, may be applied over the electrocoat layer. The color coat may be a topcoat enamel. However, in the automotive industry, the color coat is often a basecoat that is overcoated with a clearcoat layer. The primer-surfacer, topcoat enamel, basecoat, and clearcoat may each be either waterborne or solventborne. The coatings can be formulated and applied in a number of different ways known in the art. For example, the resin used in such coatings can be acrylic, polyurethane, polyester, or epoxy, or combinations of these. Typical topcoat formulations are described in U.S. Pat. Nos. 4,791,168, 4,414,357, and 4,546,046. The coatings can be thermoplastic or thermoset, and if thermoset, can be cured by many known mechanisms and curing agents, such as with melamines or blocked isocyanates.

The invention is further described in the following examples. The examples are merely illustrative and do not in any way limit the scope of the invention as described and claimed. All parts and percentages in the examples are by weight unless otherwise indicated.

EXAMPLES

Synthesis 1: Preparation of TETA/Propylene Carbonate Adduct

A 2-liter reaction vessel, equipped with a mixing blade, thermocouple, condenser and addition funnel, was charged with 583 grams of propylene carbonate (PC). The temperature was set to 65 degrees C. and 417 grams of triethylenetetramine (TETA) were added over a 15-minute period via the addition funnel. The temperature increased to 91 degrees C. due to the exothermic reaction. After 2 hours, the temperature was allowed to decrease to 65 degrees C. and the reaction was verified to be 100% complete by infrared spectroscopy. The solid TETA/PC adduct (I) had an amine equivalent weight of 202.

Synthesis 2: Preparation of the Epxoy Adduct

A 5-liter reaction vessel equipped with a mixing blade, thermocouple, condenser and addition funnel, was charged with 752.0 grams of epoxy resin (CIBA GY2600, WPE= 188, available from Ciba-Geigy Corporation, Ardsley, N.Y.), 228 grams of Bisphenol A, and 52.0 grams of xylene. The mixture was heated to 130 degrees C., then 0.7 grams of triphenylphosphine were added. The reaction exothermed to 180 degrees C. and was then cooled to 150 degrees C., where the temperature was maintained for 1 hour. The reaction completion was verified by epoxy titration. The weight per epoxy was 500 grams solid resin/epoxy eq. The resin was reduced with 257.5 grams of ethylene glycol monobutyl ether to 76% solids to form the epoxy adduct (II).

Synthesis 3: Preparation of the Self-Crosslinking Resin

A 3-liter reaction vessel equipped with a mixing blade, thermocouple, condenser, and addition funnel was charged with 304.6 grams of TETA/PC Adduct (I) and 1538.7 grams of Epoxy Adduct (II). The temperature was increased to 60 degrees C. After 30 minutes, the temperature was increased to 90 degrees C. and maintained at that temperature for 60 minutes. The resin solids were reduced by the addition of 196.2 grams of xylene. The remaining epoxy groups were capped with 287.6 grams of the ketimine of diethylenetriamine (Amicure KT-22 from Air Products, Pittsburgh, Pa.). The final self-crosslinking resin (III) had an amine equivalent weight of 439.7 grams solid/eq. nitrogen and was 72% solids. The resin had a molecular weight ($M_n$) by GPC of 3430.

Synthesis 4: Emulsification of the Self-Crosslinking Resin at 50% Neutralization To a 1-gallon plastic pail were added 972.2 grams of the self-crosslinking resin (III), 61.0 grams of plasticizer (Synfac 8100 from Milliken Chemical, Spartanburg, S.C.), 0.76 grams of dibutyl tin dilaurate, and 1.5 grams of surfactant (Surfynol 104BC from Air Products, Pittsburgh, Pa.). The contents of the pail were mixed for 15 minutes and then 65.9 grams of 86% lactic acid were added. This was mixed for 15 minutes, after which 388.1 grams of deionized water were added. The agitation was increased to high speed for 45 minutes. The agitation was then slightly reduced and 851.1 grams of deionized water were added in 3 portions over 45 minutes. The emulsion was then diluted with 1000.0 grams of deionized water. The final particle size was 45 nm.

Synthesis 5: Emulsification of the Self-Crosslinking Resin at 30% Neutralization To a 1-gallon plastic pail were added 694.4 grams of the self-crosslinking resin (III), 43.5 grams of plasticizer (Synfac 8100 from Milliken Chemical, Spartanburg, S.C.), 0.54 grams of dibutyl tin dilaurate, and 1.1 grams of surfactant (Surfynol 104BC from Air Products, Pittsburgh, Pa.). The contents of the pail were mixed for 15 minutes and then 28.3 grams of 86% lactic acid were added. This was mixed for 15 minutes, after which 266.5 grams of deionized water were added. The agitation was increased to high speed for 45 minutes. The agitation was then slightly reduced and 591.1 grams of deionized water were added in 3 portions over 45 minutes. The emulsion was then diluted with 650.1 grams of deionized water, mixed, and further diluted with 568.9 grams of deionized water. The final emulsion particle size was 120 nm. The final solids were 20.5%. The pH was 7.7. The base content was 1.307 eq. nitrogen/gram solid. The acid content was 0.445 eq. acid/gram solid.

Cure Check of Self-Crosslinking Emulsion

A 4 mil-thick drawdown of the self-crosslinking emulsion was made on a clean glass plate. The plate was placed in an oven for 30 minutes at 350 degrees F. and then the oven temperature was increased to 400 degrees F. and maintained for an additional 30 minutes. The baked film was smooth, clear and well coalesced. The film had excellent integrity and was not tacky. After cooling the film was checked for cure: 75 rubs with a saturated cloth just cut through the film.

We claim:

1. A method for making an aqueous dispersion of a self-crosslinkable cationic polymer, comprising the steps of:
   (a) forming an epoxide-functional prepolymer having polyepoxide and extender segments, wherein each extender segment has at least one pendant hydroxyalkylene carbamate group;
   (b) reacting the epoxide groups of the prepolymer with an amine compound having at least one epoxide-reactive group and at least one blocked primary amine group to form a polymer;
   (c) forming an aqueous dispersion of the polymer by means of unblocking the primary amine groups and at least partially neutralizing the amine groups of the polymer before or during addition of a sufficient amount of water to form a dispersion of the polymer.

2. A method according to claim 1 wherein the polyepoxide used to form the prepolymer is a diepoxide.

3. A method according to claim 1 wherein the polyepoxide used to form the prepolymer is a diglycidyl ether of a diol.

4. A method according to claim 1 wherein the polyepoxide used to form the prepolymer is a mixture of a diepoxide and a triepoxide.

5. A method according to claim 4 wherein the diepoxide used to form the prepolymer is the diglycidyl ether of bisphenol A.

6. A method according to claim 1 wherein the polyepoxide used to form the prepolymer is the reaction product of a diepoxide and a modifying compound selected from the group consisting of alkoxypolyamines and polyphenols.

7. A method according to claim 1 wherein the weight per epoxide of the polyepoxide used to form the prepolymer is from 150 to 2000.

8. A method according to claim 1 wherein the weight per epoxide of the polyepoxide used to form the prepolymer is from 500 to 1200.

9. A method according to claim 1 wherein the weight per epoxide of the polyepoxide used to form the prepolymer is from 500 to 800.

10. A method according to claim 1 wherein each extender segment has two pendant hydroxyalkylene carbamate groups.

11. A method according to claim 10 wherein the extender segment is of the formula

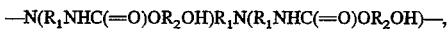

—N($R_1$NHC(=O)O$R_2$OH)$R_1$N($R_1$NHC(=O)O$R_2$OH)—, wherein $R_1$ and $R_2$ are each independently alkylene groups of up to 3 carbon atoms.

12. A method according to claim 11 wherein $R_1$ and $R_2$ are each ethylene groups.

13. A method according to claim 1 wherein the hydroxyalkylene carbamate group is a hydroxyethyl carbamate group.

14. A method according to claim 1 wherein the hydroxyalkylene carbamate group is a hydroxypropyl carbamate group.

15. A method according to claim 1, wherein the epoxide-functional prepolymer is formed by:
   (a) reacting an extender, having at least two epoxide-reactive groups and at least one blocked primary amine group, with an excess of a polyepoxide;
   (b) unblocking the primary amine groups; and
   (c) reacting the primary amine groups with an alkylene carbonate.

16. A method according to claim 15 wherein the extender is triethylenetetramine having blocked primary amine groups.

17. A method according to claim 15 wherein the polyepoxide is bisphenol A.

18. A method according to claim 15 wherein the alkylene carbonate is ethylene carbonate or propylene carbonate.

19. A method according to claim 1, wherein the epoxide-functional prepolymer is formed by:
   (a) reacting an extender, having at least one primary amine group and at least two epoxide-reactive groups, with an alkylene carbonate to form at least one pendant hydroxyalkyl carbamate group;
   (b) reacting the epoxide-reactive groups with an excess of a polyepoxide.

20. A method according to claim 19 wherein the extender is triethylenetetramine.

21. A method according to claim 19 wherein the polyepoxide is bisphenol A.

22. A method according to claim 19 wherein the alkylene carbonate is ethylene carbonate or propylene carbonate.

* * * * *